United States Patent [19]
Forman

[11] Patent Number: 6,139,662
[45] Date of Patent: Oct. 31, 2000

[54] METHODS OF MAKING RESEALABLE PACKAGES, METHOD AND APPARATUS

[75] Inventor: Harold M. Forman, Pennsburg, Pa.

[73] Assignee: Sealstrip Corporation

[21] Appl. No.: 09/232,715

[22] Filed: Jan. 19, 1999

Related U.S. Application Data

[62] Division of application No. 08/861,576, May 22, 1997, Pat. No. 5,944,425.

[51] Int. Cl.$^7$ .............................. B65B 61/18; B65D 30/10

[52] U.S. Cl. .............................. 156/66; 156/204; 156/227

[58] Field of Search .............................. 156/66, 91, 204, 156/227; 24/587; 383/63; 493/213

[56] References Cited

FOREIGN PATENT DOCUMENTS 1384725  11/1964  France ...................................... 383/42

*Primary Examiner*—Sam Chuan Yao
*Attorney, Agent, or Firm*—Walter B. Lidell

[57] ABSTRACT

Methods of making flexible packages having an openable and resealable interlocking closure from a continuous web of flexible film, the closure being formed transversely to the direction of film flow at the consumer preferred position across one end of the package during package formation at line speed. The system utilizes a converter device mounted atop or adjacent to standard packaging apparatus to form a small amount of the running packaging film into the resealable closure structure as an integral part of the film extending transversely to the long dimension of the package. The converter functions with both horizontal and vertical form/fill/seal wrapping machines and with overwrap packagers, and uses diverse packaging films. The package formation begins by feeding the plastic packaging film into the converter where the film is first automatically fanfolded across the entire width of the film to form a stack, the layers of which are immediately heat sealed together forming a multilayered semi-rigid strip of typically one half inch width extending completely across the film width in plane with the film. The number of folds in the stack varies depending on the thermoforming properties and thickness of the particular film being used. In one embodiment of the invention, the resealable locking feature is next thermoformed into the multilayered strip which then continues through the packaging machinery in the usual manner, encircling the product and passing through the end sealer where the package ends are sealed and cut, and the front and back film panels are pressed together closing the resealable locking feature.

18 Claims, 15 Drawing Sheets

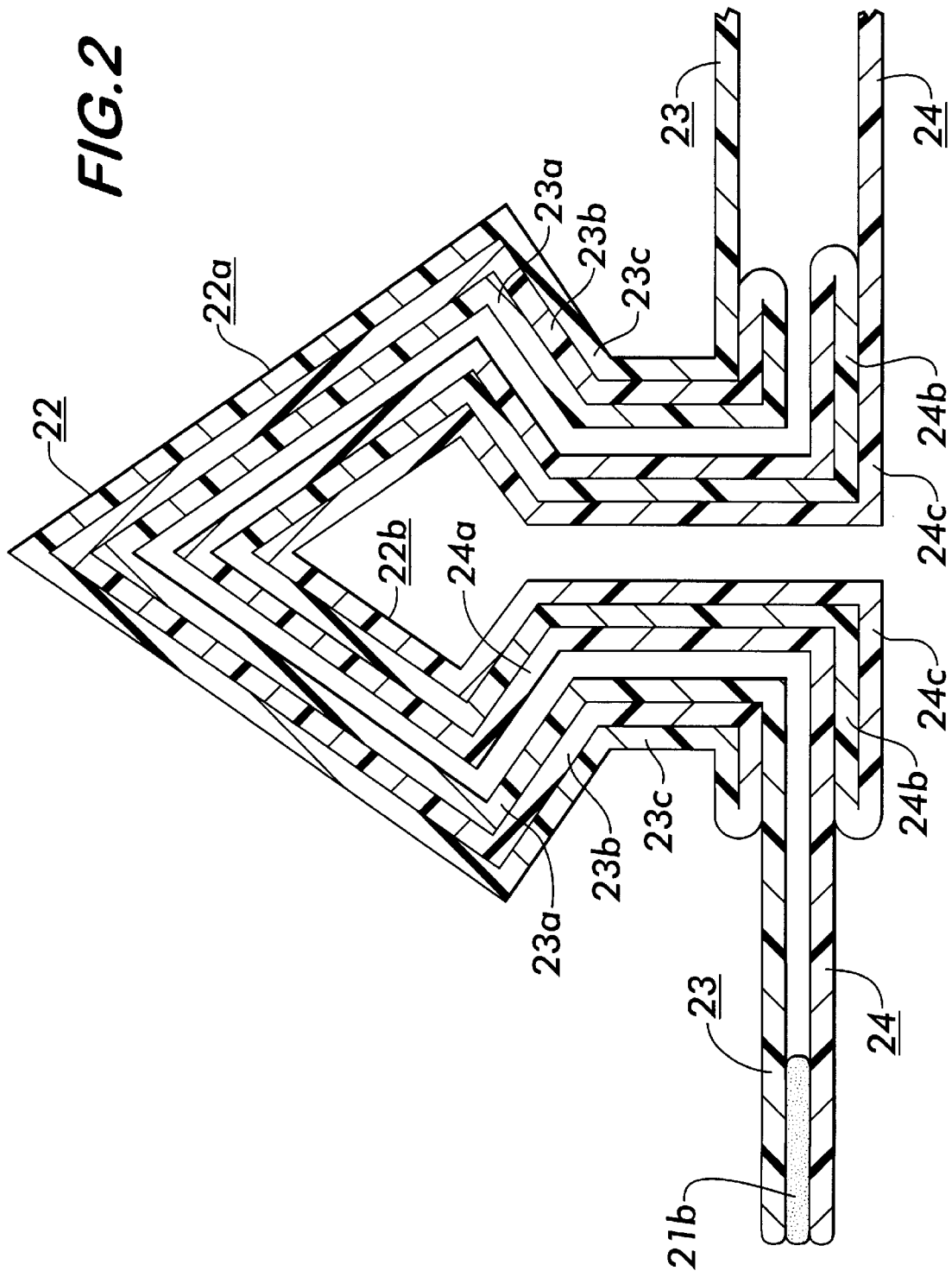

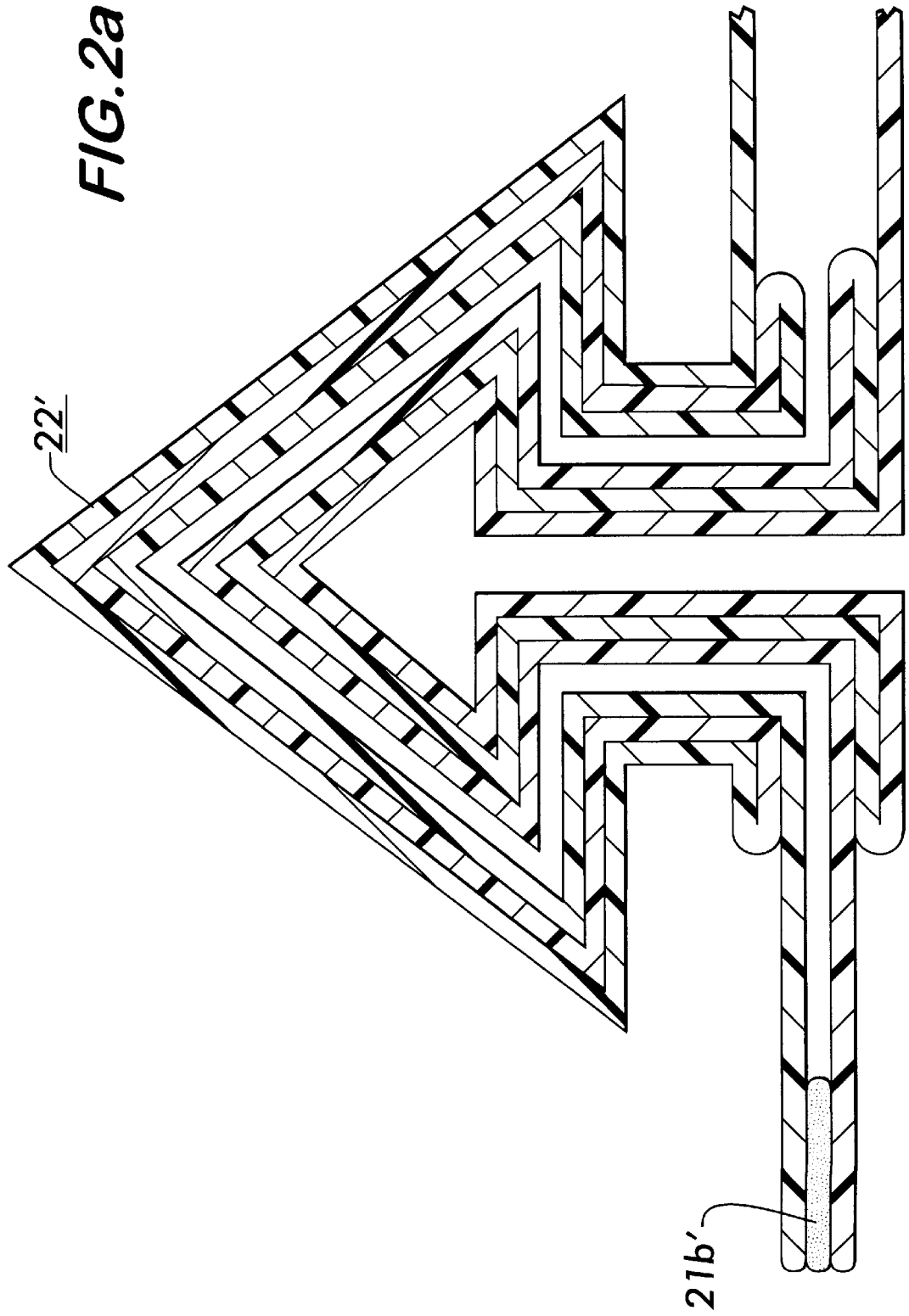

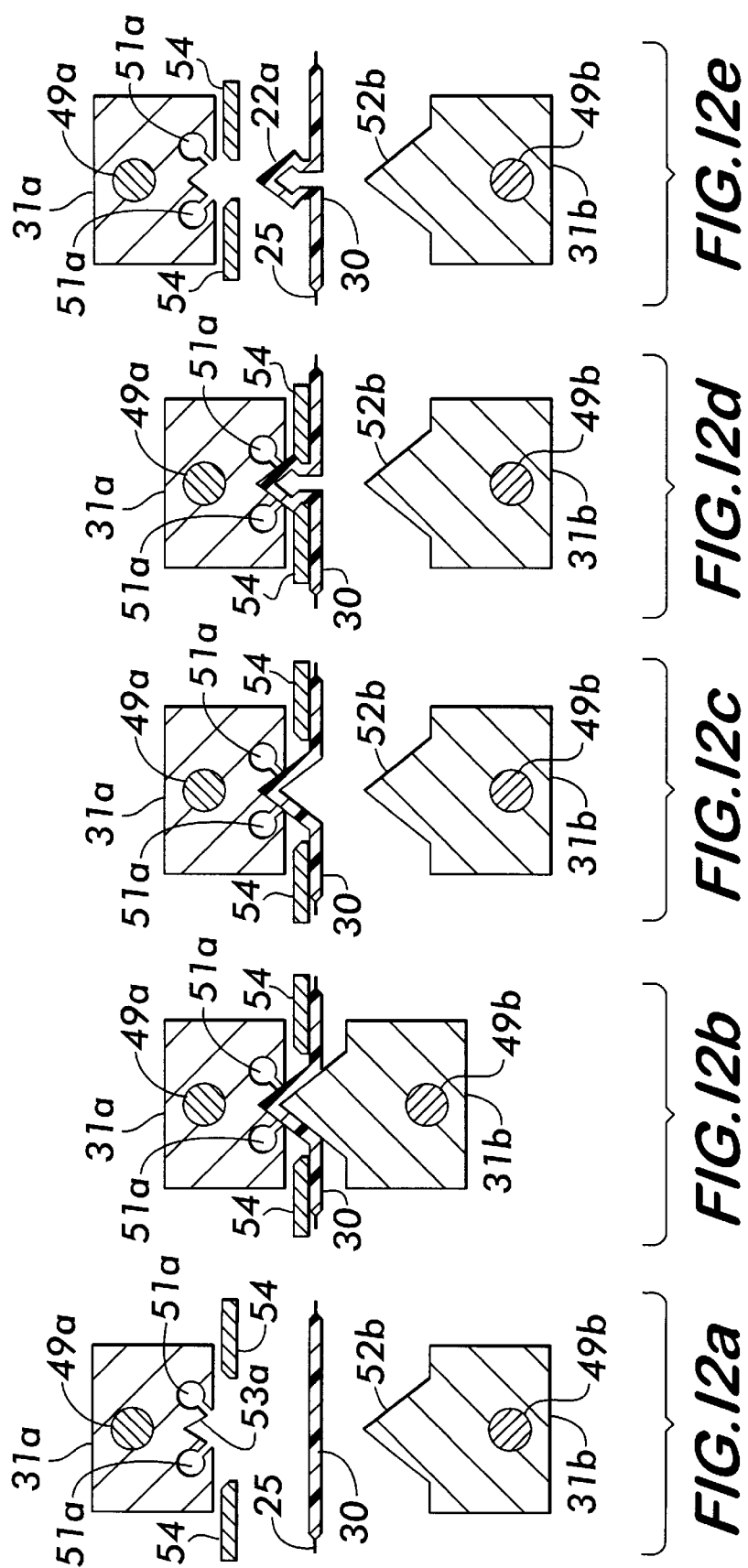

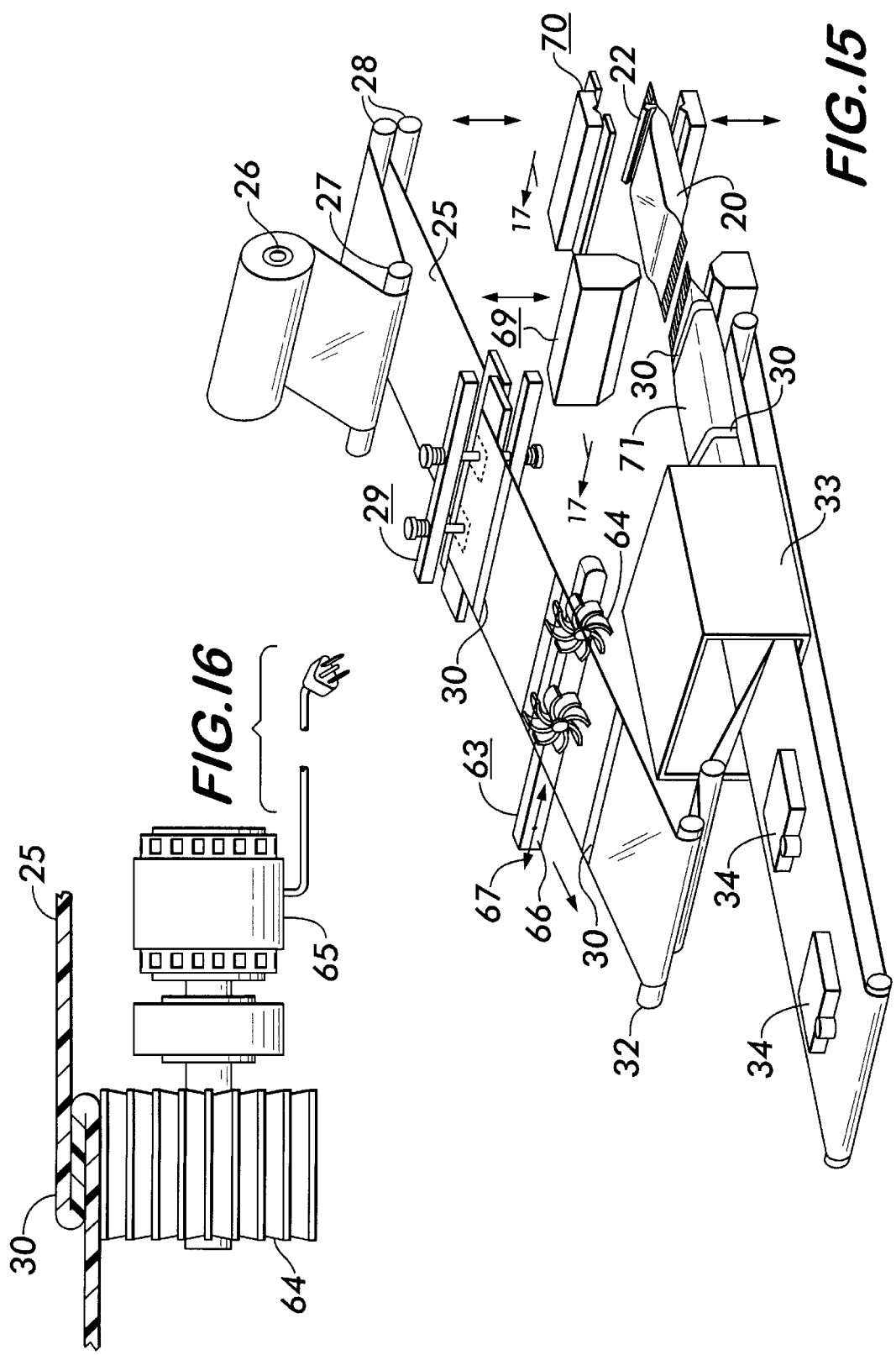

METHODS OF MAKING RESEALABLE PACKAGES, METHOD AND APPARATUS

This application is a divisional of application Ser. No. 08/861,576 filed on May 22, 1997 now U.S. Pat. No. 5,944,425.

This invention relates generally to packaging systems, and more particularly to methods for making flexible packages having an openable and resealable interlocking closure from a continuous web of flexible film, the closure being formed transversely to the direction of film flow at the consumer preferred position across one end of the package during package formation at line speed.

BACKGROUND OF THE INVENTION

In the past, the methods of making reclosable flexible packages have involved either the extrusion of the locking structure along with the film extending longitudinally in the direction of film extrusion along the opposite edges of the film, or by heat sealing a separately made resealable closure structure to the package film. The first type of package formation results in packages having the reclosable feature in the consumer non-preferred position along the long edge of the package, while the second type of package formation results in packages which are expensive to make because of the need to inventory and store rolls of the separate resealable closure structure for attachment to the packaging film and the need to insure that the separately obtained packaging film and closure structure are made of compatible materials.

SUMMARY OF THE INVENTION

The package and system according to the invention are not so limited because the system utilizes a novel converter device mounted atop or adjacent to standard packaging apparatus to form a small amount of the running packaging film into the resealable closure structure as an integral part of the film oriented in the consumer desired direction extending transversely to the long dimension of the package. The converter functions with both horizontal and vertical form/fill/seal wrapping machines and with overwrap packagers, and uses diverse double sided heat seal packaging films such as polypropylene, polyester, polyvinyl chloride, high and medium density polyethylene, thermoplastic heat seal coated non-plastic films, and various film laminations.

The package formation begins by feeding the plastic film, as it unwinds from the storage roll, into the the converter where the film is first automatically layered by fanfolding across the entire width of the film to form a stack. Layering other than by fanfolding to form a stack may be utilized, but fanfolding is a convenient and economical method of stack forming. The number of folds will vary depending on the thermoforming properties and thickness of the particular film being used. Once folded the stacked layers are immediately heat sealed together forming a multilayered semi-rigid strip of typically one half inch width extending completely across the film width in plane with the film. Next, in one embodiment of the invention, the resealable locking feature is thermoformed into the multilayered strip which then continues through the packaging machinery in the usual manner, encircling the product and passing through the end sealer where the package ends are sealed and cut. Finally, as the package exits from the end sealer, the front and back film panels are pressed together closing the resealable locking feature.

In another embodiment of the invention the multilayered semi-rigid strip carried by the packaging film is abraded on one surface to remove the thermoplastic heat seal coating and leave that surface of the strip uncoated, the film being then passed into the package forming apparatus where the product wrapping takes place. After emerging from the package forming apparatus the package ends are sealed and the package resealable locking feature is completed. The entire process takes place at packaging line speed.

It is a primary object of the invention to provide novel methods of making a flexible package having an openable and resealable interlocking closure.

Another object of the invention is to provide novel methods of making a flexible package having an openable and resealable interlocking closure in which the closure is formed transversely to the direction of film flow at the consumer preferred position across one end of the package.

A further object of the invention is to provide novel methods of making packages as aforesaid which are formed during the packaging operation running at line speed.

Yet a further object of the invention is to provide novel methods of making packages as aforesaid in which the resealable interlocking closure is integrally formed from layered together contiguous portions of the packaging film during the packaging process and does not require that additional materials be added to the packaging film to form the resealable closure.

A still further object of the invention is to provide novel methods of making packages as aforesaid in which the packages may be formed from a variety of packaging films such as polypropylene, polyester, polyvinyl chloride, high and medium density polyethylene, and various film laminations.

Still another object of the invention is to provide novel methods of making packages as aforesaid in which the resealable interlocking closure is integrally formed from the packaging film by reversely fanfolding the packaging film across its running width to form a stack, sealing together the reversely folded stack in plane with the film, and thermoforming the sealed stack into the resealable locking feature.

The foregoing and other objects of the invention will be more clearly understood from a reading of the following description in conjunction with an examination of the appended drawings, wherein:

FIG. 2 is an enlarged cross sectional view through the resealable closure and package end seal as would be seen when viewed along the line 2—2 on FIG. 1;

FIG. 2a is a view similar to FIG. 2 but showing a modified form of resealable closure;

Figure 1:
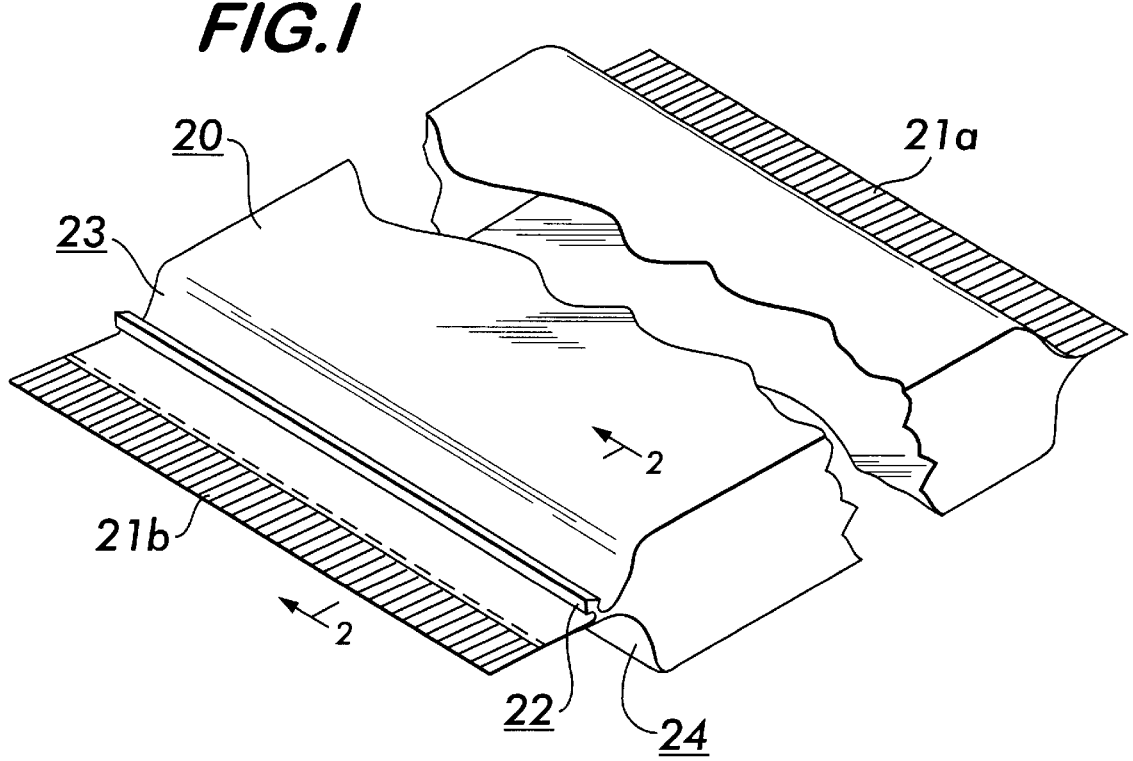
FIG. 1 is an isometric view of a package according to the invention showing the package end seals and the integrally formed resealable locking feature.
Figure 3:
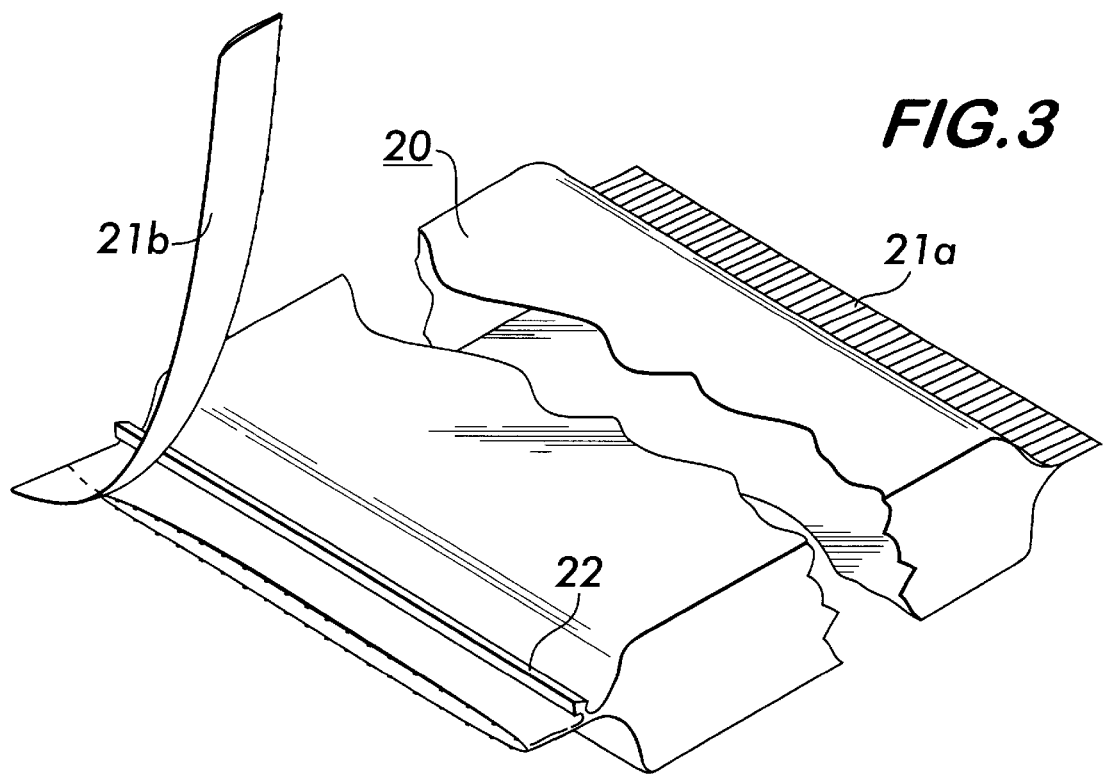
Figure 4:
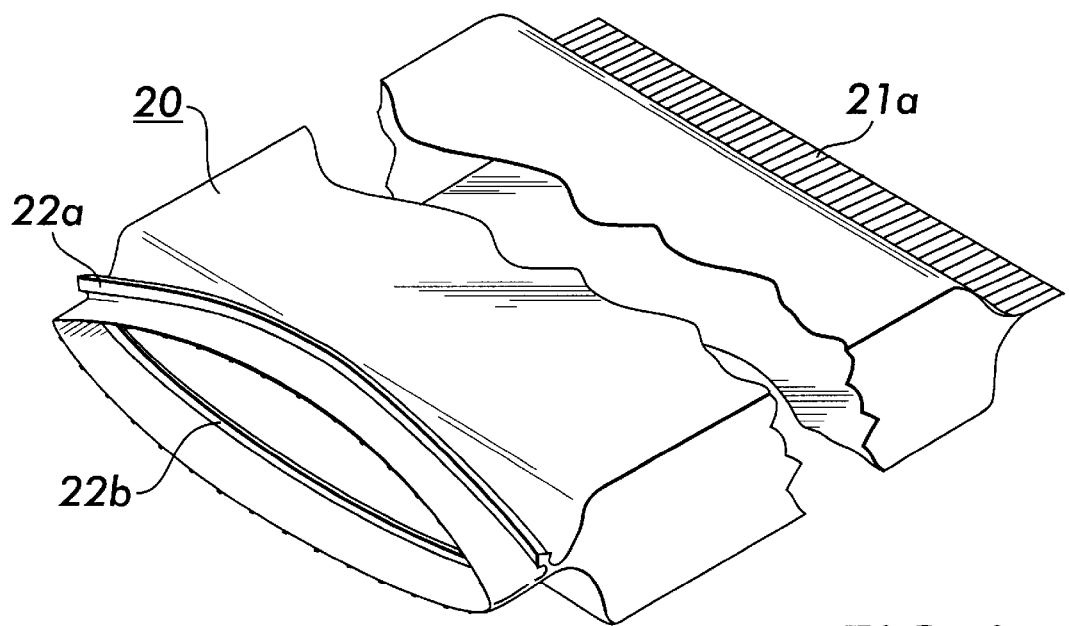
Figure 5:
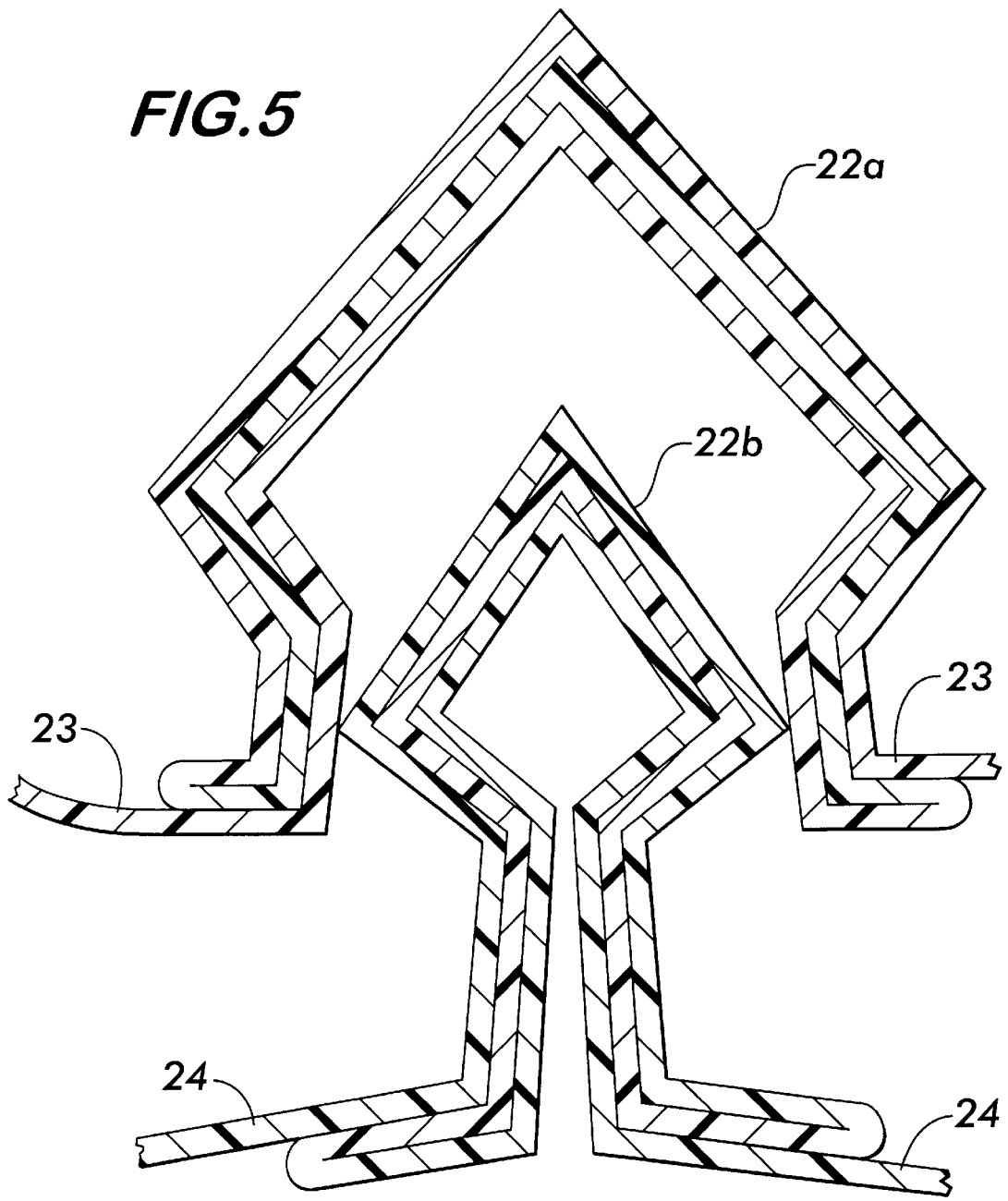
Figure 6:
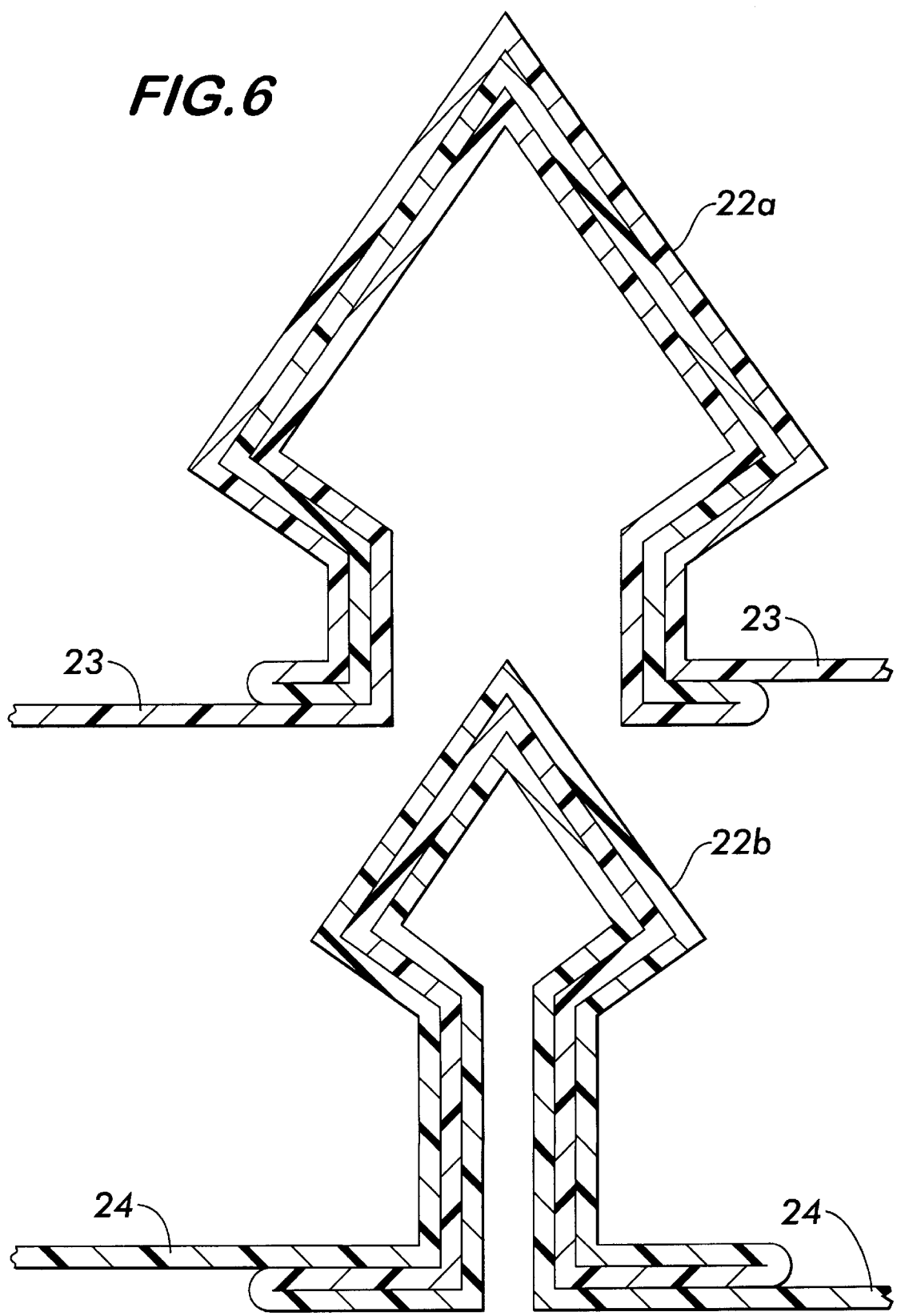
Figure 7:
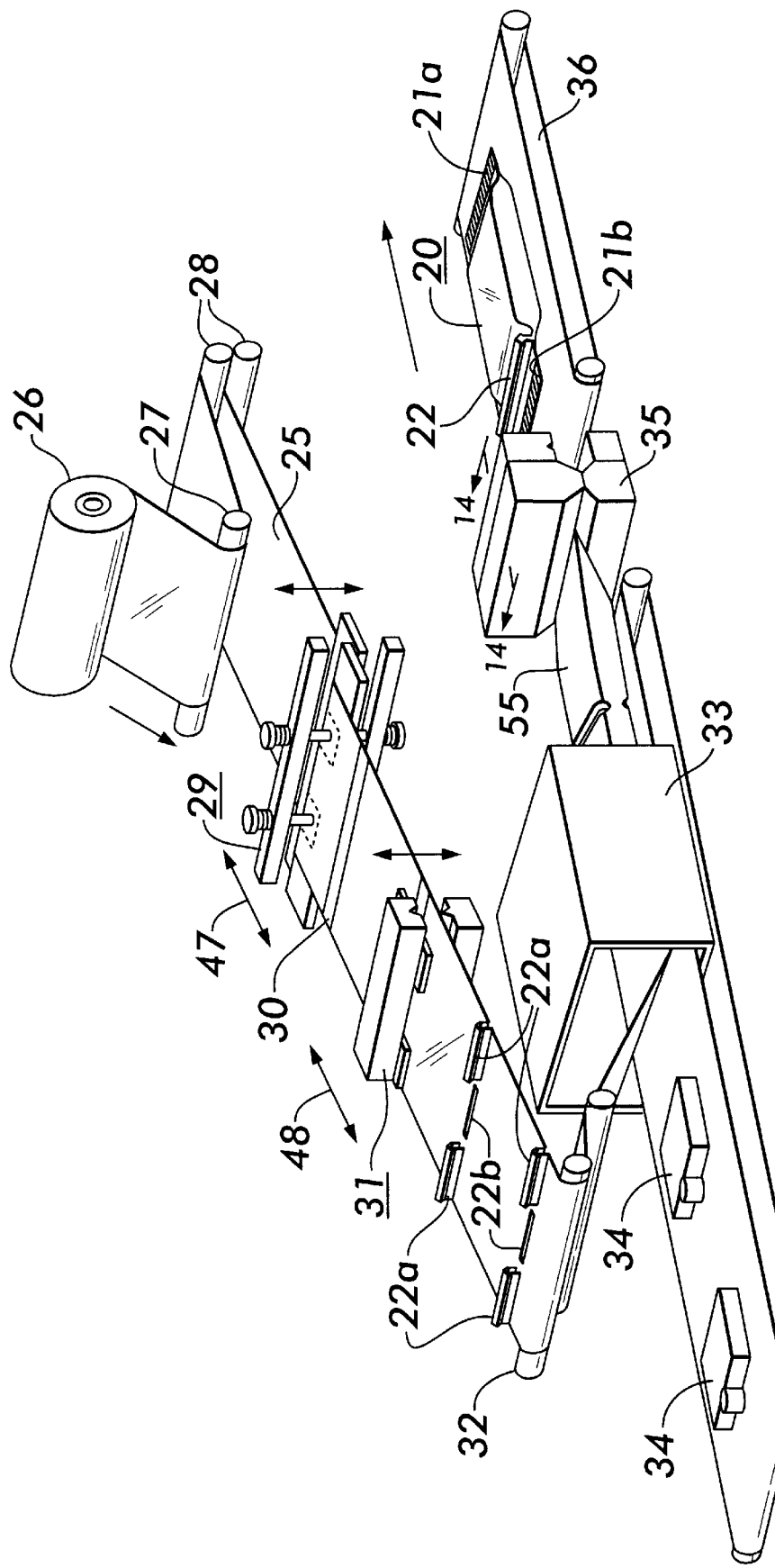
Figure 8:
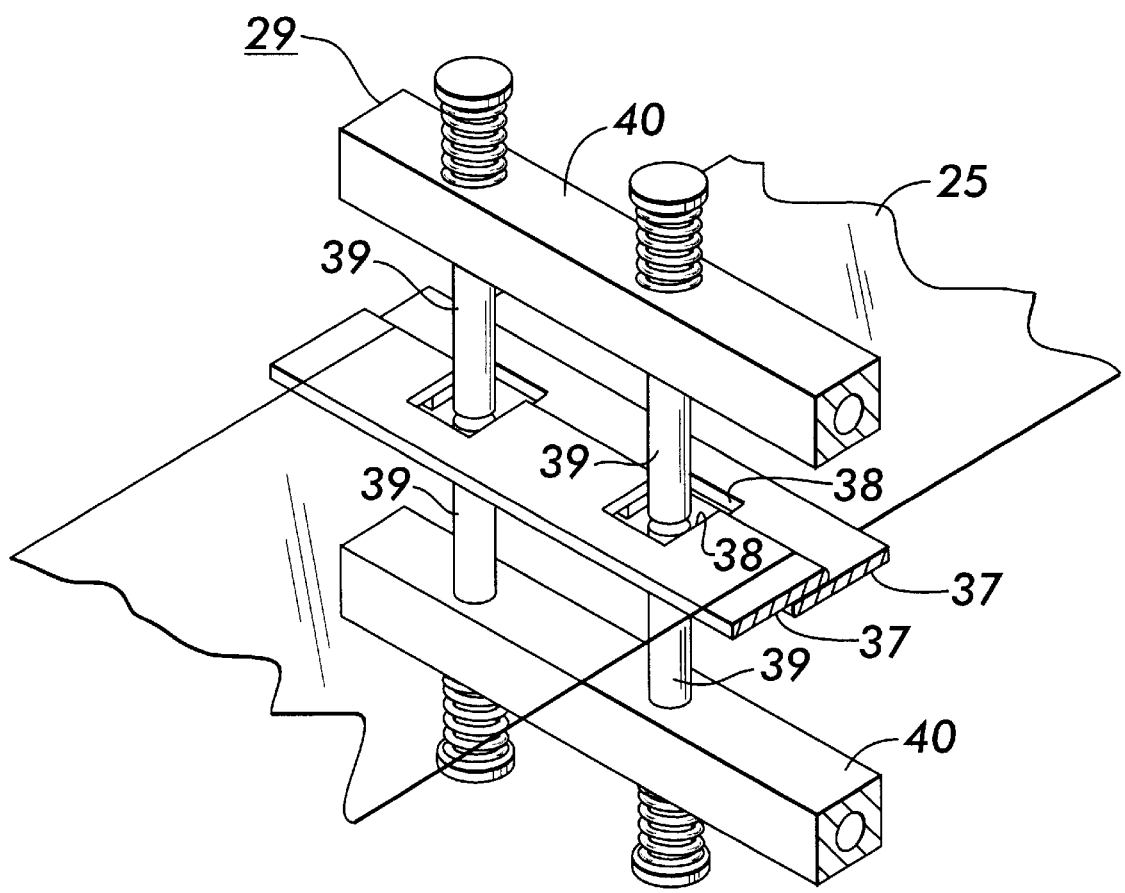
Figure 10A:
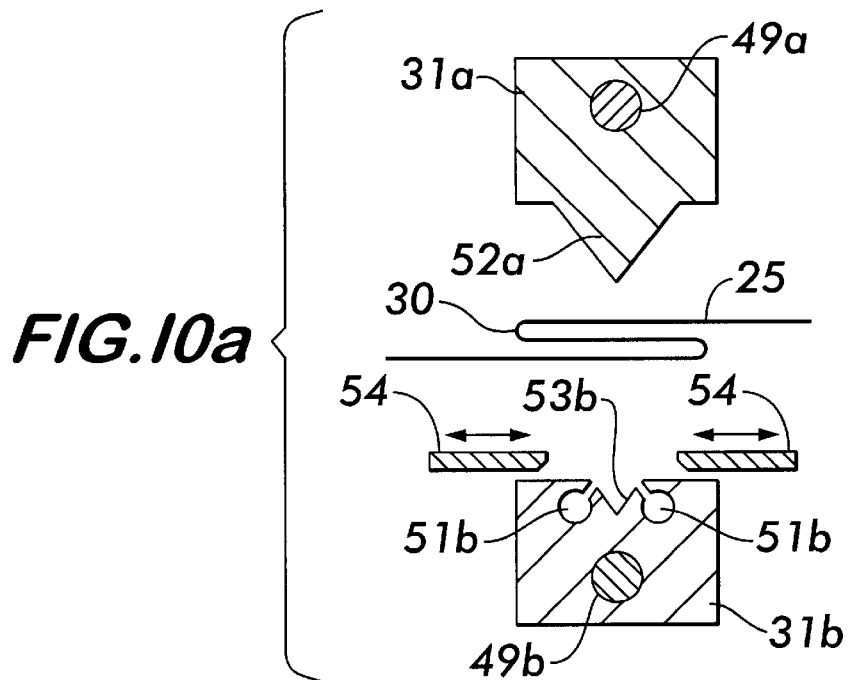
Figure 10:
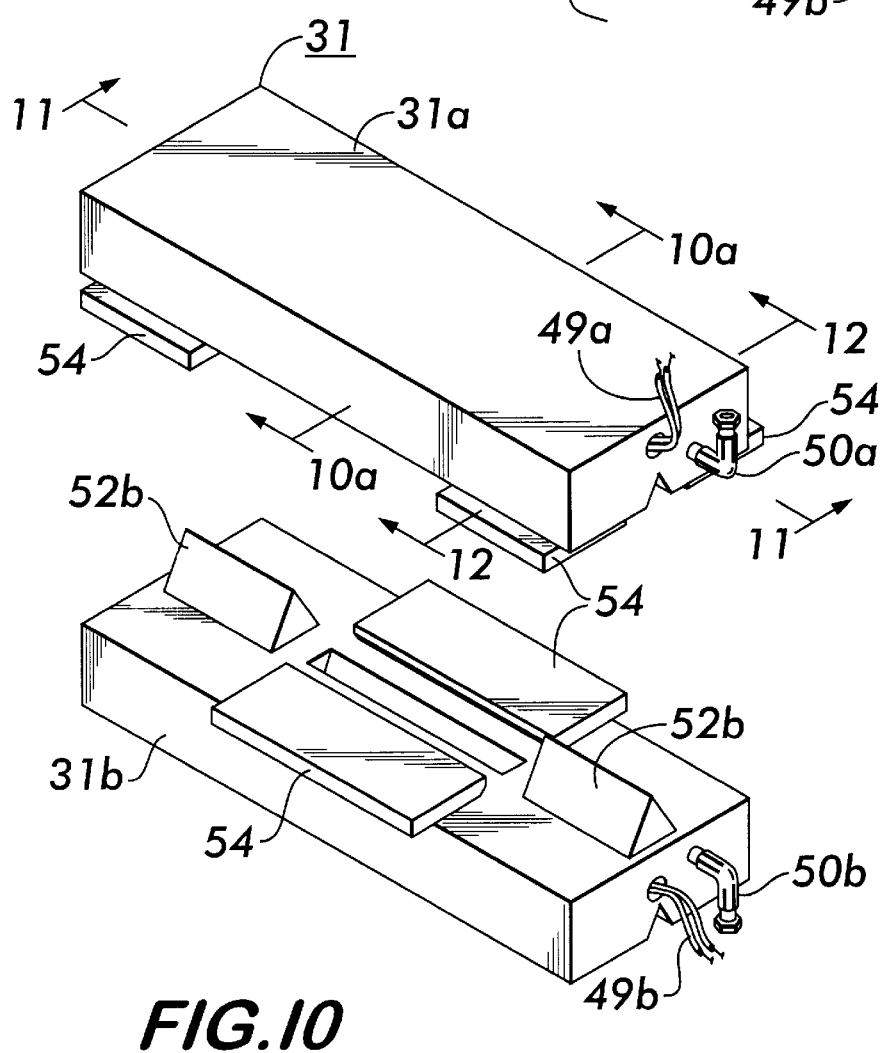
Figure 11:
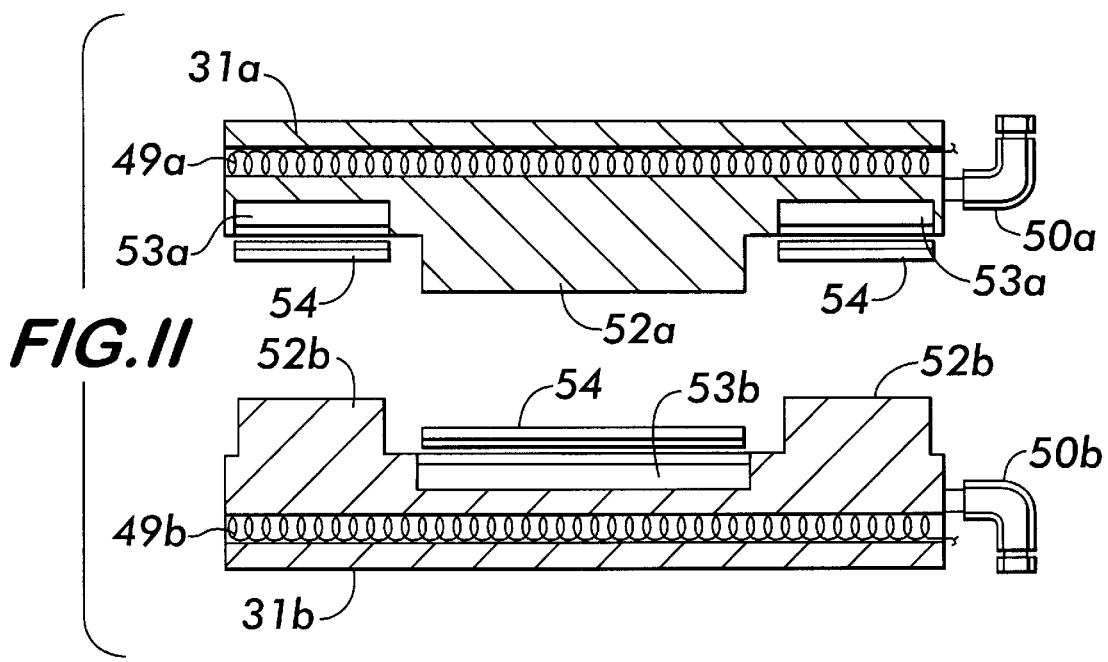
Figure 13:
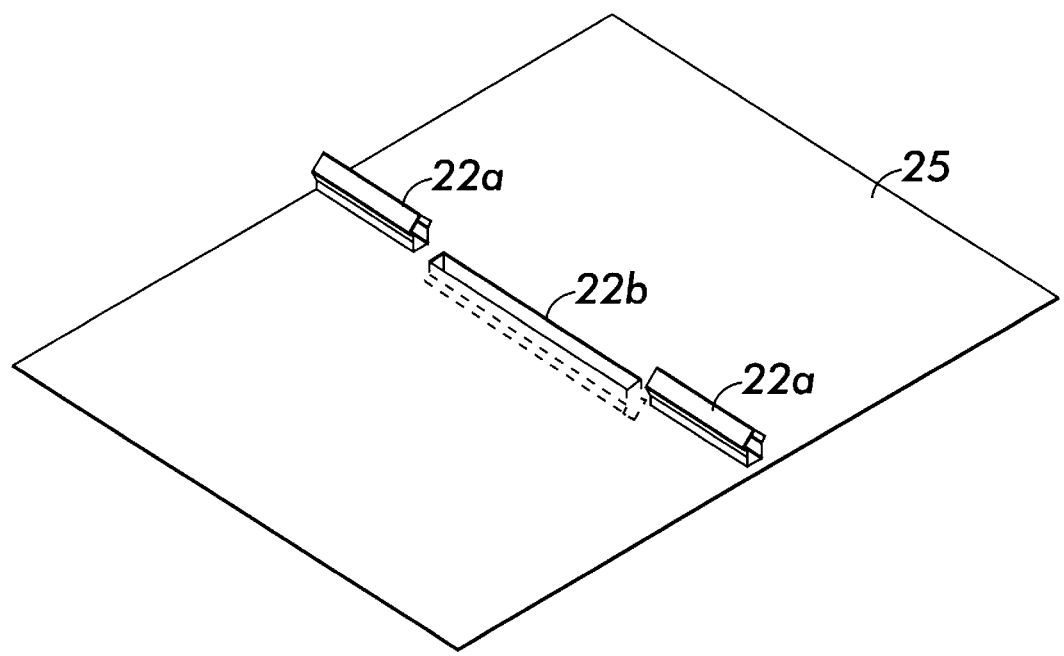
Figure 14:
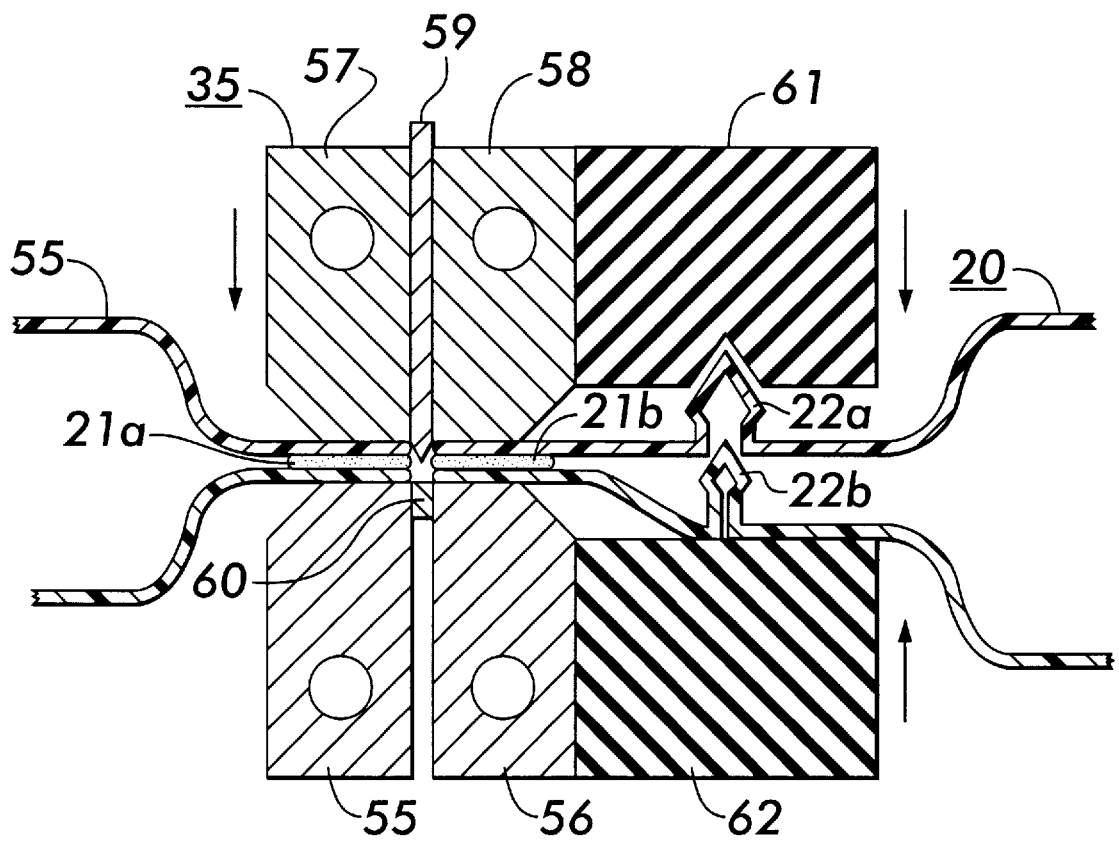
Figure 17:
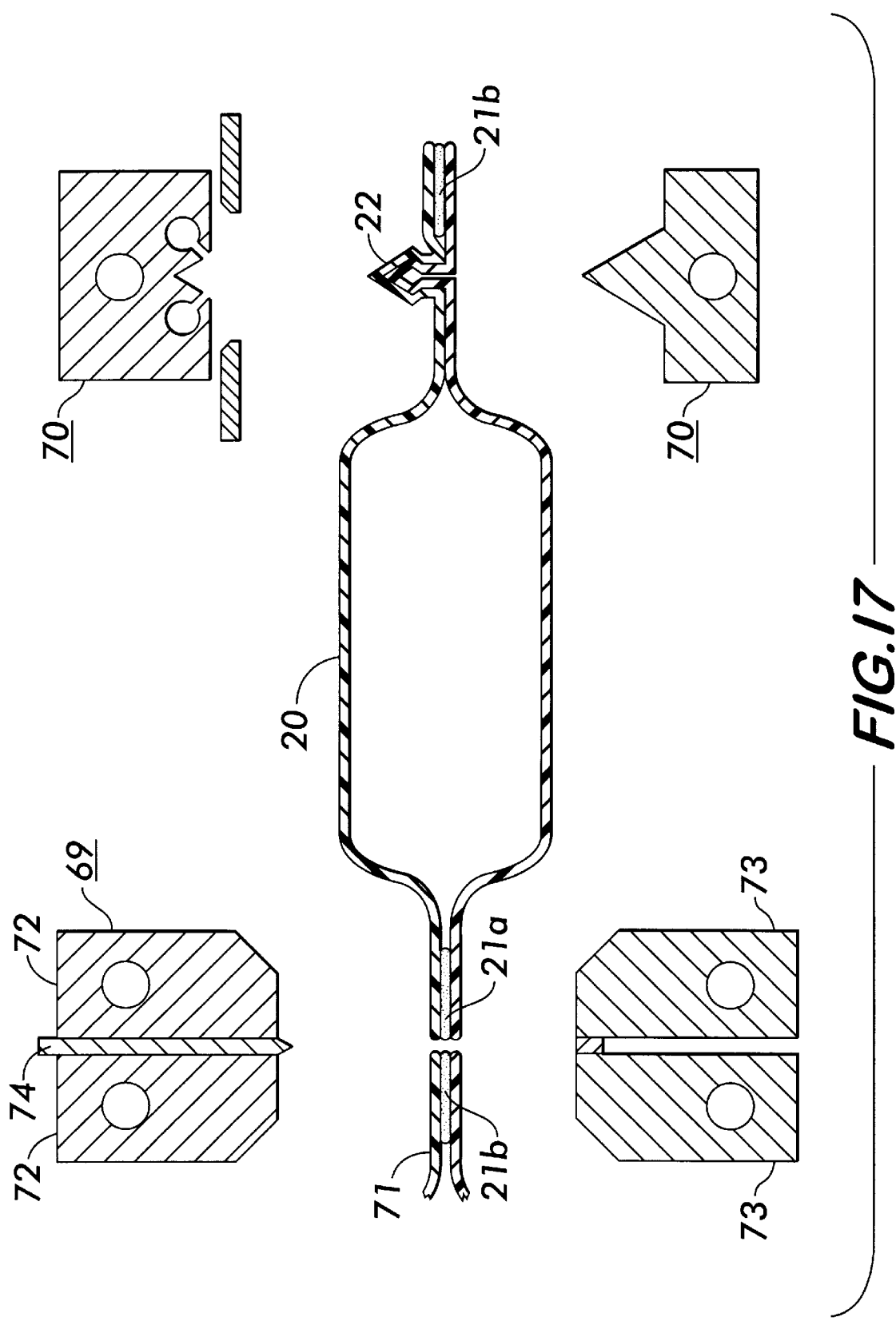

FIGS. 3 and 4 respectively show the tearing off of the package endseal and the opening of the resealable closure of a package as in FIG. 1;

FIGS. 5 and 6 show progressive stages of opening the interlocking resealable package closure shown in FIG. 2;

FIG. 7 is a diagrammatic illustration of one form of apparatus for and method of formation of novel packages according to the invention, showing the stages of closure forming from the packaging film during the packaging process;

FIG. 8 is an isometric view of the portion of the apparatus which accomplishes the fanfolding of the film;

FIGS. 9a through 9e are cross sectional views through the apparatus of FIG. 8 showing the stages of formation of a fanfolded and sealed film stack;

FIG. 10 is an isometric view of the portion of the apparatus which forms the resealable locking feature;

FIG. 10a is a cross sectional view through the apparatus of FIG. 10 as would be seen when viewed along the line 10a—10a on FIG. 10 showing a reversely folded sheet of film positioned for forming a part of the resealable locking feature;

FIG. 11 is a cross sectional view through the apparatus of FIG. 10 as would be seen when viewed along line 11—11 on FIG. 10;

FIGS. 12a through 12e are cross sectional views through the apparatus of FIG. 10 as would be seen when viewed along the line 12—12 on FIG. 10 showing the stages of thermoformation of another portion of the resealable closure locking feature;

FIG. 13 is an isometric view of the completely formed resealable locking closure feature in the film;

FIG. 14 is a cross sectional view through the package end sealing and closure device for the resealable closure locking feature as would be seen when viewed along line 14—14 on FIG. 7;

FIG. 15 shows a modification of the apparatus shown in FIG. 7 in which the resealable locking feature is formed as the package is sealed;

FIG. 16 is an end view of the film scouring wheels seen in FIG. 15 before the wrapping station; and FIG. 17 is a cross sectional longitudinal view through the completed package, including the package end seals and resealable locking feature forming mechanisms as would be seen when viewed along line 17—17 on FIG. 15.

In the several figures, like elements are denoted by like reference characters.

Figure 1A:
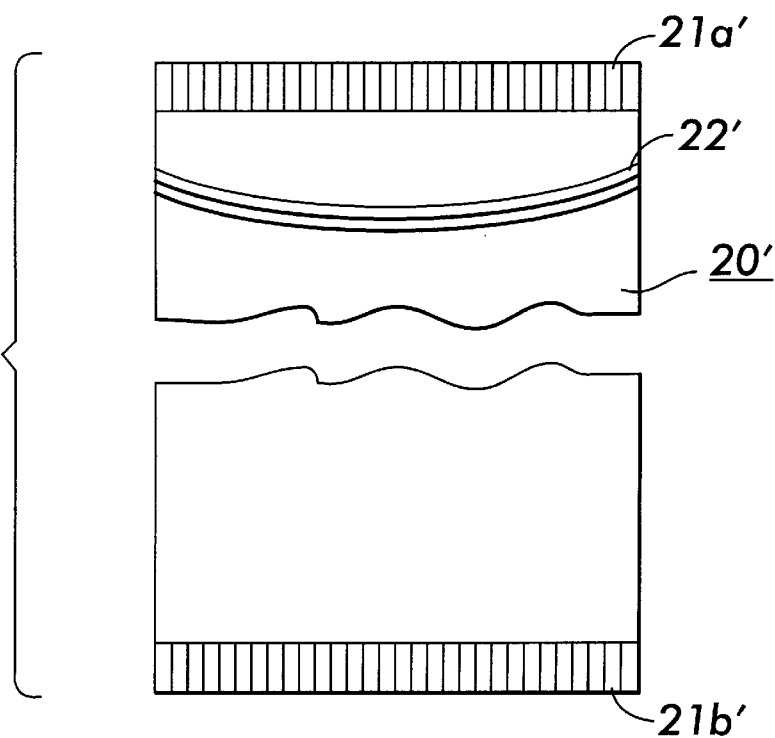
FIG. 1a is a plan view of an alternative form of package according to the invention showing the package end seals and the integrally formed resealable locking feature.

Considering first FIGS. 1 and 1a, there are seen packages 20 and 20' respectively, each having respective package heat sealed end seals 21a/21b and 21'a/b, and resealable package locking closures 22 and 22'. The packages are identical except for the shape of the resealable locking closures, closure 22 being formed along a straight line, while closure 22' is formed along an arc. The straight line form of closure requires less package length than the arcuate form, but the arcuate form provides somewhat easier package opening because the opening force is effectively applied to a shorter length of the closure. Both types are formed in the same way, as will be subsequently shown.

The resealable closures are formed during the package making process from multiple reversely fanfolded layers of the film from which the packages are made, as best seen in the enlarged cross-sectional views of FIGS. 2 and 2a, to which attention should be now directed. The internested closure sections of FIG. 2a are seen to be of triangular cross-section with the open base legs segments in horizontal alignment, whereas the closure sections 22a and 22b of FIG. 2 are seen to be formed with the open base legs angled inwardly downward toward one another in an arrowhead shape instead of in horizontal disposition. This angled orientation of the base legs results in easier package opening and reclosing. In FIG. 2 the upper film portion 23 of the package 20 is seen to be reversely folded into three layers 23a, 23b, and 23c forming the outer section 22a of the closure 22, with the lower film portion 24 being similarly folded into three layers 24a, 24b, and 24c forming the inner section 22b of the closure 22. Three layers are shown for illustration, but it will be understood that more layers, such as five or even seven, may be used as the package and film characteristics determine. The same arrangement is shown in the closure form of FIG. 2a.

FIGS. 3 through 6 illustrate the opening of the package 20 by first tearing off the end seal 21b adjacent to the closure 22 as shown in FIG. 3, and opening the resealable locking closure 22 by separating the outer and inner sections 22a and 22b as shown in FIG. 4. The separation process is illustrated in FIGS. 5 and 6 where the outer and inner sections 22a and 22b are seen in FIG. 5 being respectively expanded and compressed as the inner section 22b is pulled out of the outer section 22a, and springing back to their static state conditions as illustrated in the completely separated showing of FIG. 6.

FIG. 7 is a diagrammatic showing of one form of apparatus for producing finished packages as shown in the preceding Figures. Film 25 from a roll 26 of heat sealable packaging film is spooled off and fed around roller 27 and between rollers 28 to the film fanfolding device 29 where at package length intervals the film is multiple folded and heat sealed into approximately half inch width strips (stack) 30 extending fully widthwise of the running film. To accomplish this the film 25 is either made of thermoplastic material or is thermoplastically coated. The film then passes through the resealable closure forming device 31 where the strips 30 are heat and pressure formed into the resealable closures 22, passes around the rollers 32 and into the packaging machine 33 where the items 34 to be packaged are wrapped, and emerges for end sealing, package cutting, and interlocking engagement of the resealable locking closure by the device designated generally as 35, being thereafter carried away for packing for shipment by conveyor 36.

Figure 9A:
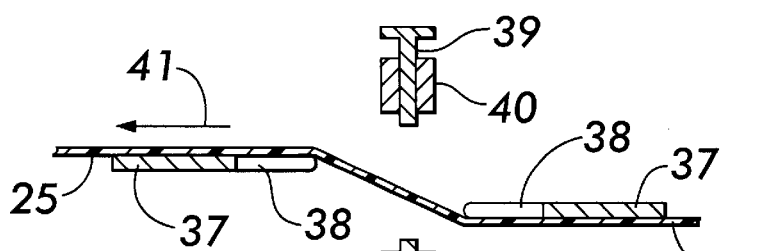
Figure 9B:
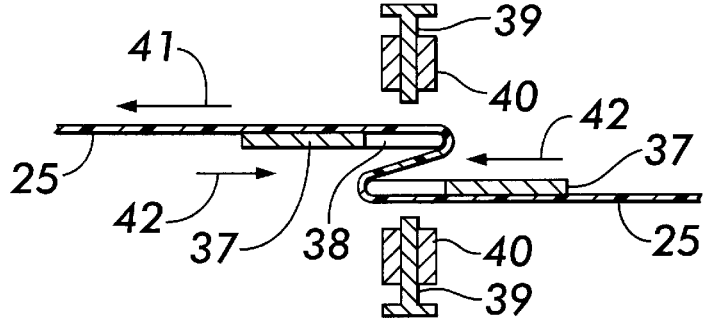
Figure 9C:
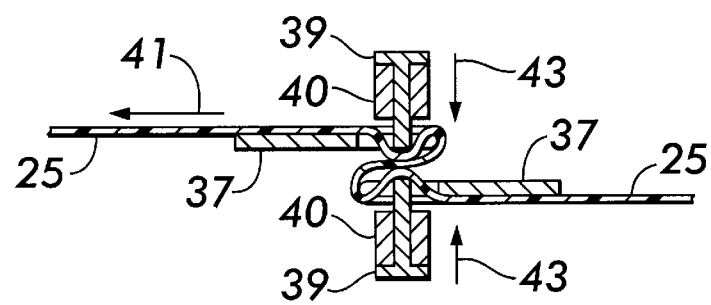
Figure 9D:
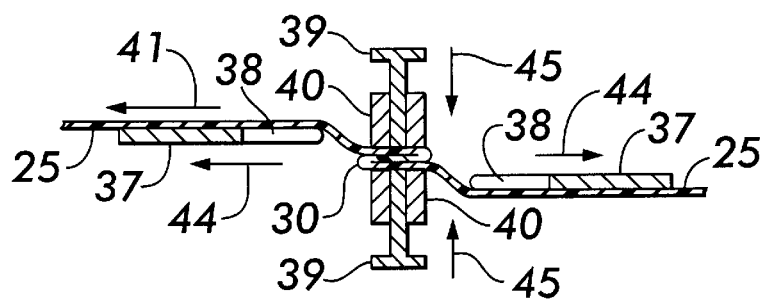

The fanfolding device 29 and the process of forming the film 25 to include the heat sealed fanfolded strip 30 are shown in detail in FIGS. 8 and 9, the position of the apparatus of FIG. 8 being that shown in the operating cycle position of FIG. 9c. The device 29 essentially consists of, a pair of fanfolding plates 37 having window slots 38, the plates being synchronously shiftable toward and away from one another in slightly separated parallel planes, upper and lower film clamping guide rods 39, and heating bars 40 carried on the guide bars 39. The film 25 moves from right to left between the plates 37 as shown by arrows 41 in FIG. 9a. As shown in FIG. 9b by the arrows 42, the plates 37 are shifted toward one another into overlapping position to form a three layer fanfold of film 25 with the windows 38 of the plates 37 vertically aligned. Next, as shown in FIG. 8 and in FIG. 9c by the arrows 43, the film clamping guide rods are shifted toward one another through the windows 38 to clamp the three layers of film together. As shown in FIG. 9d by arrows 44, the plates 37 are retracted away from one another, while as shown by arrows 45 the heating bars 40 are shifted toward one another and into engagement with the upper and lower outer surfaces of the fanfolded film strip to seal the layers together into the heat sealed strip 30.

Figure 9E:
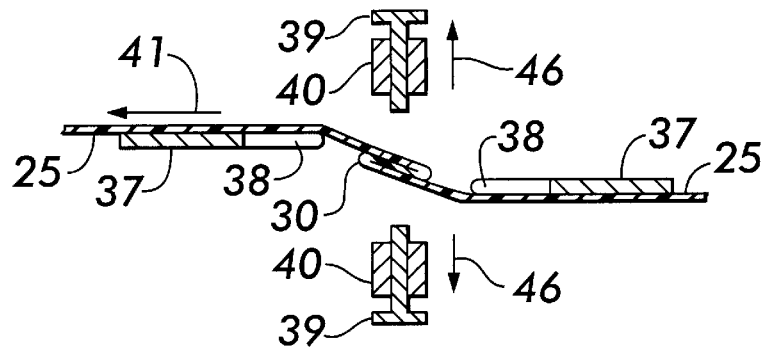

Finally, as shown by arrows 46 in FIG. 9e, the rods 39 and heating bars 40 are retracted, and the strip 30 moves out of the fanfolding device on its way to the device 31 for formation of the resealable closure parts 22a and 22b, as seen in FIGS. 7 and 10 through 13. It should be understood that during the course of formation of the strip 30 the entire apparatus 29 moves in the direction of motion of the film 25 and then retracts to its initial position in preparation for the next cycle of strip formation, as shown by the arrow 47. Similarly, it is to be understood that during the cycle of formation of the resealable closure parts 22a and 22b from the strip 30 the entire apparatus 31 moves in the direction of motion of the film 25 and then retracts to its initial position in preparation for the next cycle, as shown by the arrow 48.

As best seen in FIGS. 10 through 13, the device 31 includes an upper section 31a and a lower section 31b, which are respectively provided with heaters 49a and 49b, and with vacuum manifold fittings 50a and 50b which connect a selectively actuatable vacuum source to the vacuum manifolds 51a and 51b. Upper section 31a is provided with a triangular depending central anvil 52a, and lower section 31b is provided with a pair of spaced apart triangular end sections anvils 52b, all of the anvil sections being longitudinally aligned. Formed in the upper section 31a in apposition to the end anvils 52b of the lower section 31b are a pair of complementally shaped triangular recesses 53a, while formed in the lower section 31b in apposition to the central anvil 52a of the upper section 31a is a complementally shaped triangular recess 53b. The structure is completed by aligned coplaner pairs of upper section end forming plates 54 and a pair of lower section central forming plates 54, the plates of each pair being disposed for reciprocation toward and away from one another with all plates being actuated simultaneously.

Formation of the resealable closure parts 22a is illustrated in FIG. 12, which, it is to be understood, while showing the formation of an end part 22a also shows the operating sequence for formation of the central part 22b by the structure of FIG. 10a. As the heat sealed strip 30 comes into position within the forming device 31 as shown in FIG. 12a, the forming device starts to move longitudinally with the film 25 and the forming sequence is initiated. As shown in FIG. 12b, the heated upper and lower forming sections 31a and 31b move toward one another and mate, heat forming the strip 30 into the recesses 53a and 53b where the strip is retained in position by vacuum drawn through the manifolds 51a and 51b. The anvils 52a, and 52b as shown in FIG. 12c, then retract while the vacuum continues to hold the strip in the recesses. The forming plates 54 of each pair, as seen in FIG. 12d, then move toward one another and shape the inturned legs into the heat softened strip 30. Finally, as seen in FIG. 12e, the forming plates are retracted and the vacuum is released, thereby releasing the formed resealable closure. The forming device is then retracted to its starting position in preparation for forming the next closure. The closure formed running film is shown in FIG. 13. The film 25 with its formed closures 22a and 22b moves into the packaging machine 33 along with the items 34 to be packaged, and emerges as a wrapped but unsealed package unseparated from the preceding and succeeding packages.

The completion of the packaging by sealing and separation takes place at the sealing station sealing and locking device 35, shown in FIG. 7 and in the enlarged cross sectional detail of FIG. 14, to which reference should now be made. The first wrapped product 55 emerges from the packaging machine 33 and passes into the sealer 35 where the leading portion of the film passes over the lower heat sealing bars 55 and 56, the upper heat sealing bars 57 and 58 descending to form the opposite end seals 21a and 21b shown in FIG. 1, followed closely by the descent of the cutting bar 59 which severs the seals 21a/21b from one another. The sealing device 35 is then opened to release the just formed end seals and allow the partially completed package 55 to pass through. This first seal 21b formed by the sealer bars 56/58 is discarded as scrap since it is not part of a package, the seal 21a formed by the sealer bars 55/57 becoming the leading end seal of what will become the first package 20.

Consider now that the partially completed first package, originally designated as 55 In FIG. 14 and being now designated 20, has passed completely through the open sealing device 35 so that the part of the packaging film carrying the closures 22a and 22b at the trailing end of the open package is disposed between the resilient upper and lower pressure blocks 61 and 62 of the locking device 35 with a portion of flat film extending to the left between the sealer bars 55–58 to the beginning of the next wrapped product 55. The sealing device 35 is again closed so that a new set of end seals 21a and 21b are formed and separated, and simultaneously the upper and lower pressure blocks 61 and 62 are moved toward one another to press the inside closure part 22b into latching engagement inside the outside closure part 22a. The sealing device 35 is again opened to release the just formed end seals and allow the separated completed package 20 to be moved off for disposition and permit the next partially completed package 55 to pass through. This sequence repeats and produces a continuous line of packaged products.

A second embodiment of a method and apparatus for forming the packages 20 is shown in FIGS. 15 to 17. The apparatus of FIG. 15 is similar to that of FIG. 7 in many aspects as shown by the same reference characters applied to common elements. The film 25 is spooled off of roll 26 and into the fanfolded strip forming device 29 where heat sealed multilayer strips 30 are sequentially formed as previously described. These strips then proceed to an abrader, generally designated as 63, where the undersurface of the strip 30 is abraded to remove the thermoplastic heat seal coating and leave that surface of the strip uncoated. As seen in FIGS. 15 and 16 the abrader 63 includes a pair of abrading wheels 64 driven by motors 65 supported on a carrier bar 66. The carrier bar 66 reciprocates transversely to the running length of the film to treat the entire surface of the strip 30, as shown by arrow 67, and also moves longitudinally with the film for a distance sufficient to complete the strip abrasion. Upon completion of a strip treatment the abrader moves downward out of engagement with the film and returns to its starting place to engage the next strip. The film is then passed into the package forming apparatus 33 where product wrapping takes place. After emerging from the package forming apparatus the package ends are sealed by a sealing device 69, and at the same time the package resealable locking feature is completed from the strip 30 by a closure former 70, all as best seen from FIGS. 15 and 17. A wrapped product 71 carrying strips 30 emerges from the packaging machine 33 and passes to a position between the sealing device 69 and the closure former 70. The upper and lower heat sealing bars 72 and 73 move toward one another to heat seal the ends of adjacent packages to form the opposite end seals 21a and 21b shown in FIGS. 1 and 17, followed closely by the descent of the cutting bar 74 which severs the seals 21a/21b of the adjacent packages from one another. As seen in FIG. 15, the strips 30 have been wrapped during packaging so that each strip is disposed in two layers, one above the other with the abraded surfaces in contact. When the strip 30 is heat formed into the resealable closure 22 by the closure former 70 in the manner already described in connection with the apparatus of FIG. 10, the facing abraded surfaces of strips 30 remain unsecured to one another so that they may be subsequently separated. This sequence repeats and produces a continuous line of packaged products.

Having now described the invention in connection with particularly illustrated embodiments thereof, it will be understood that modifications and variations of the invention may now occur from time to time to those normally skilled in the art without departing from the essential scope or spirit of the invention, and accordingly it is intended to claim the invention both broadly and specifically as indicated in the appended claims.

What is claimed is:

1. A method of making a resealable interlocking closure for a flexible resealable package, consisting of the steps of,
   a) transporting in lengthwise direction a web of flexible packaging material of selected width and indeterminate length,
   b) fanfolding said web in the direction of the running length to form a stack of packaging material extending widthwise of the web,
   c) securing together the fanfolded layers of said stack of packaging material,
   d) forming different sections of said stack into inner and outer portions of a resealable interlocking closure.

2. The method of making a resealable interlocking closure for a flexible resealable package as set forth in claim 1 wherein said flexible packaging material has thermoplastic properties, and wherein the step of securing together said fanfolded layers of said stack of packaging material is a step of heat sealing.

3. The method of making a resealable interlocking closure for a flexible resealable package as set forth in claim 1 wherein said flexible packaging material has thermoplastic properties, and wherein the steps of securing together said fanfolded layers of said stack of packaging material and forming said interlocking closure are both steps of heat sealing.

4. The method of making a resealable interlocking closure for a flexible resealable package as set forth in claim 1 wherein said packaging material has surface thermoplastic heat sealing properties, and further including between steps c) and d) the further step of abrading one of the outer layers of said fanfolded layers of said stack of packaging material to remove its said thermoplastic heat sealing properties.

5. The method of making a resealable interlocking closure for a flexible resealable package as set forth in claim 1 wherein said step of fanfolding said web into a stack of packaging material fanfolds said stack into at least three layers.

6. The method of making a resealable interlocking closure for a flexible resealable package as set forth in claim 1 wherein said flexible packaging material comprises a flexible substrate coated with a thermoplastic material.

7. The method of making a resealable interlocking closure for a flexible resealable package as set forth in claim 1 wherein said step of forming different sections of said stack into inner and outer portions of a resealable interlocking closure includes the steps of forming one of said inner and outer portions as a continuous length and initially forming the other of said inner and outer portions as two lengths separated by said continuous length.

8. The method of making a resealable interlocking closure for a flexible resealable package as set forth in claim 1 wherein said step of forming different sections of said stack into inner and outer portions of a resealable interlocking closure includes the step of forming said inner portion as a continuous length and initially forming said outer portion as two lengths separated by said inner portion.

9. The method of making a resealable interlocking closure for a flexible resealable package as set forth in claim 1 wherein said step of forming different sections of said stack into inner and outer portions of a resealable interlocking closure includes the steps of forming said inner portion as a continuous length and initially forming said outer portion as two lengths separated by said inner portion.

10. The method of making a resealable interlocking closure for a flexible resealable package as set forth in claim 3 wherein said step of forming different sections of said stack into inner and outer portions of a resealable interlocking closure includes the steps of forming said inner portion as a continuous length and initially forming said outer portion as two lengths separated by said inner portion.

11. The method of making a resealable interlocking closure for a flexible resealable package as set forth in claim 5 wherein said step of forming different sections of said stack into inner and outer portions of a resealable interlocking closure includes the steps of forming said inner portion as a continuous length and initially forming said outer portion as two lengths separated by said inner portion.

12. The method of making a resealable interlocking closure for a flexible resealable package as set forth in claim 6 wherein said step of forming different sections of said stack into inner and outer portions of a resealable interlocking closure includes the steps of forming said inner portion as a continuous length and initially forming said outer portion as two lengths separated by said inner portion.

13. The method of making a resealable interlocking closure for a flexible resealable package as set forth in claim 6 wherein the steps of securing together said fanfolded layers of said stack of packaging material and forming said interlocking closure are both steps of heat sealing.

14. The method of making a resealable interlocking closure for a flexible resealable package as set forth in claim 13 wherein said step of forming different sections of said stack into inner and outer portions of a resealable interlocking closure includes the steps of forming said inner portion as a continuous length and initially forming said outer portion as two lengths separated by said inner portion.

15. The method of making a flexible package comprising a package body, a resealable interlocking closure, and end seals at opposite ends of the package, consisting of the steps of:
   a) transporting in lengthwise direction a web of flexible packaging material of selected width and indeterminate length,
   b) fanfolding said web in the direction of the running length at package length intervals to form a stack of packaging material extending widthwise of the web,
   c) securing together the fanfolded layers of each of said stacks of packaging material,
   d) wrapping a product within that portion of the flexible packaging material extending between a sequential pair of said secured stacks of packaging material to define a package length,
   e) folding into upper and lower apposed positions different sections of the said secured stack of packaging material adjacent one end of the defined package length,
   f) sealing and severing from one another adjacent ends of successive packages,
   g) forming a resealable interlocking closure having inner and outer portions from the said apposed different sections of the said secured stack of packaging material adjacent one end of the defined package length, and
   h) pressing the inner portion into the outer portion of the resealable interlocking closure.

16. The method of making a flexible package as set forth in claim 15 wherein steps f) and g) are carried out substantially simultaneously.

17. The method of making a flexible package as set forth in claim 15 wherein steps f), g) and h) are carried out substantially simultaneously.

18. The method of making a resealable interlocking closure for a flexible resealable package as set forth in claim 15 wherein said packaging material has surface thermoplastic heat sealing properties, and further including between steps c) and e) the further step of abrading the facing surfaces of said apposed portions of said stack of packaging material to remove therefrom said thermoplastic heat sealing properties.

* * * * *